Oct. 13, 1959  G. H. DYRDAHL  2,908,126
HAY CROP SWATHING AND TREATING MACHINE
Filed Nov. 19, 1957  3 Sheets-Sheet 3
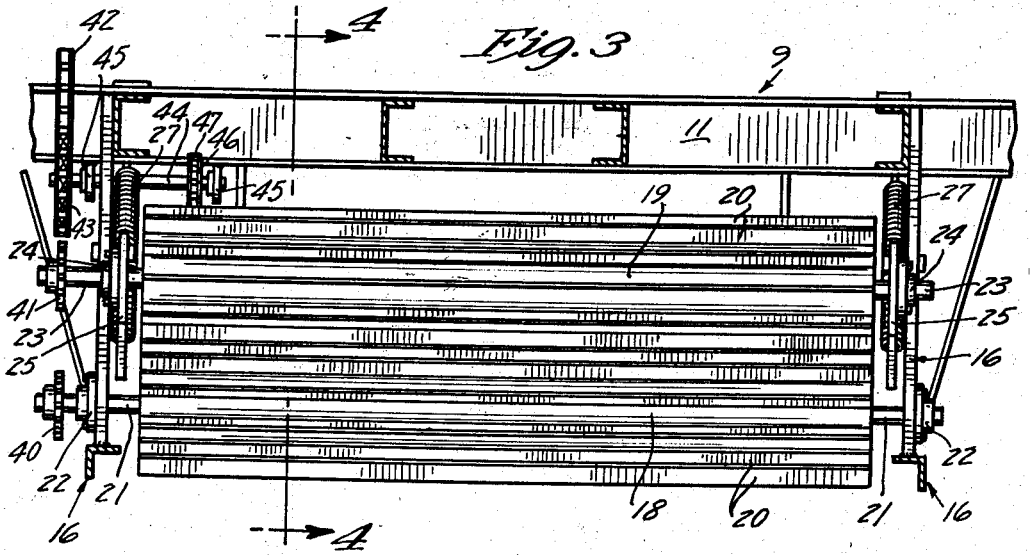
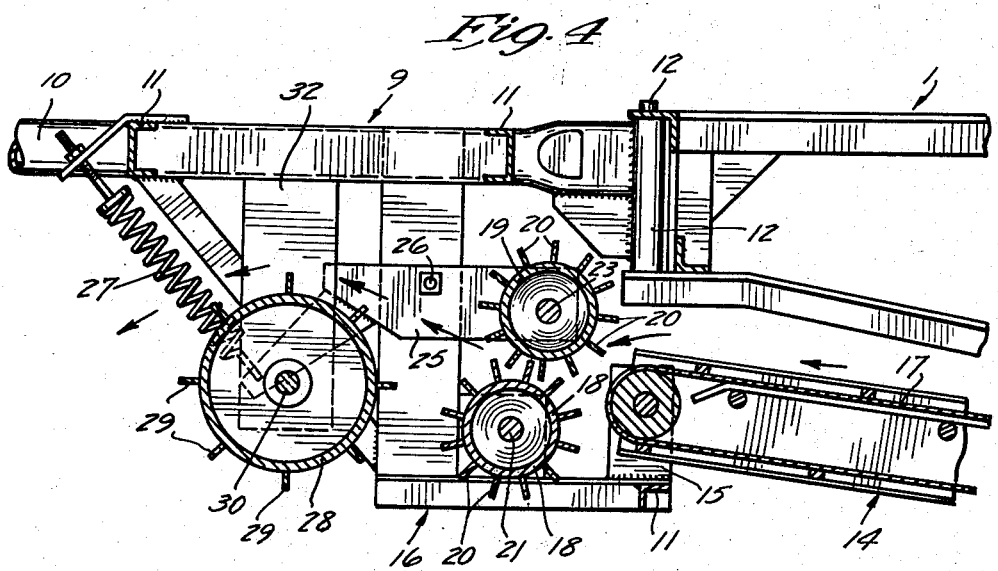
INVENTOR.
Gordon H. Dyrdahl
BY
ATTORNEYS United States Patent Office 2,908,126
Patented Oct. 13, 1959

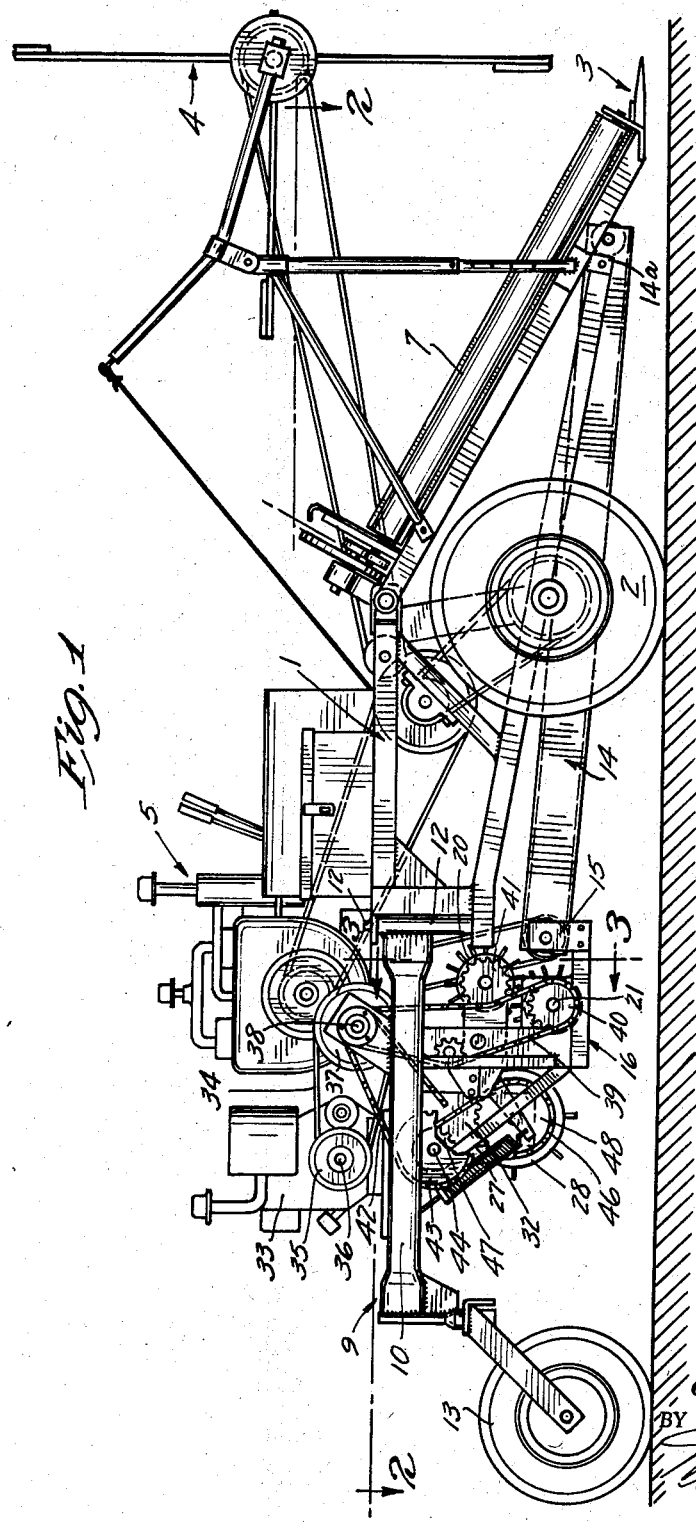

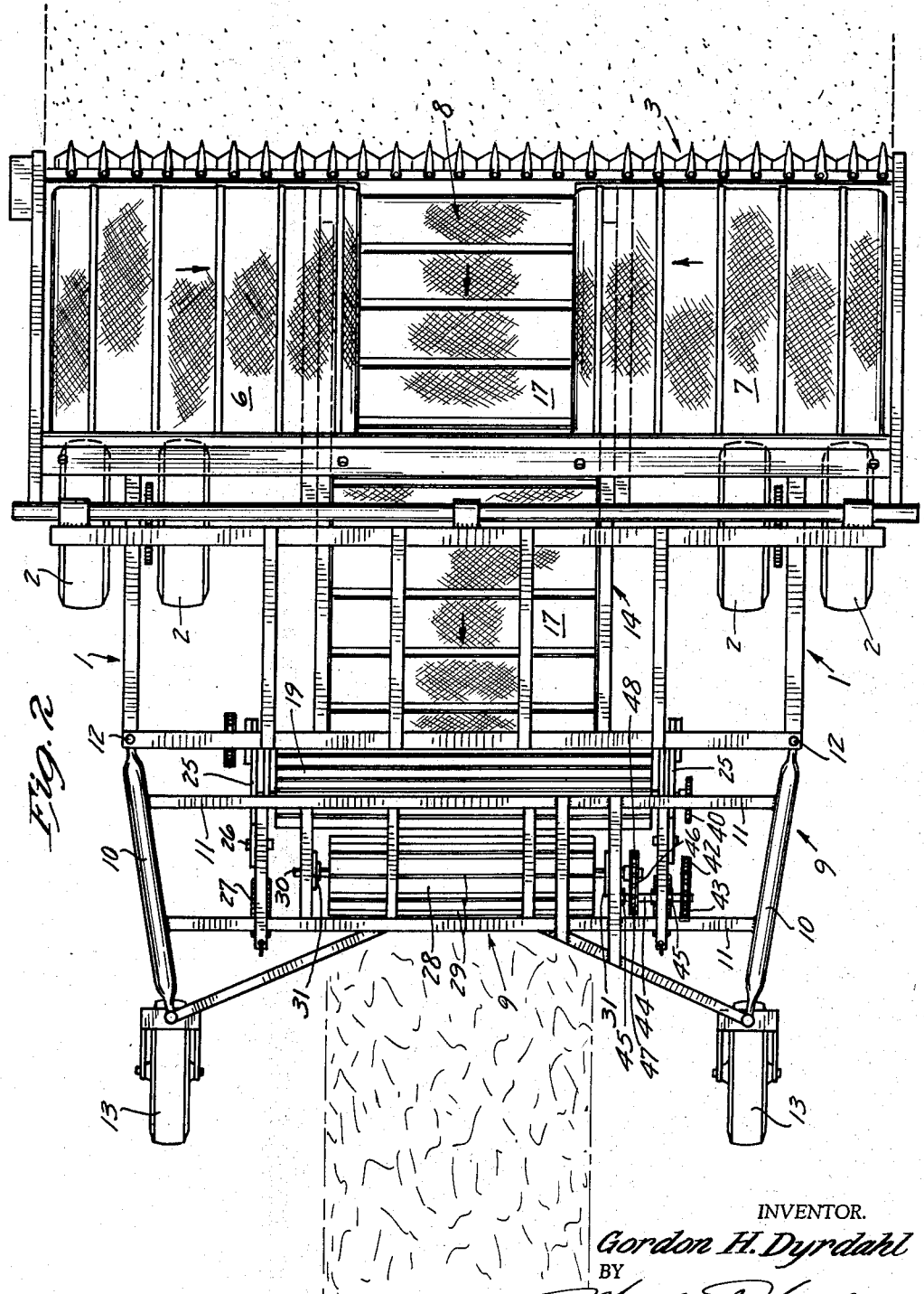

2,908,126

HAY CROP SWATHING AND TREATING MACHINE

Gordon H. Dyrdahl, Owatonna, Minn., assignor to Owatonna Manufacturing Company, Inc., Owatonna, Minn., a corporation of Minnesota Application November 19, 1957, Serial No. 697,477

3 Claims. (Cl. 56—1)

My invention relates to hay crop swathing machines, preferably of the self-propelled type, and has for its primary object the provision of means for crushing or breaking up the stems of the harvested crop to facilitate rapid drying thereof.

To the above end, I provide a pair of crushing rollers through which the newly cut crop is passed. However, such crushing rollers, of necessity, run at high speed and I have found that as a result the crushed crop is thrown to the ground in a flattened out condition which discourages free circulation of air therethrough and hence retards drying.

A further and highly important object of my invention is the provision of a tooth-equipped crop retarding roller which is so positioned with respect to the crushing rollers that it will intercept the crushed crop and slow the same down, thereby gently dropping it onto the ground in a highly fluffed windrow.

A further and highly important object of my invention is the provision of a novel attachment for conventional self-propelled crop swathing machines which will both crush the stems of the harvested crop and deposit the same on the ground in a highly fluffed windrow which encourages drying.

A further object of my invention is the provision of a device of the class immediately above described in which the crushing rollers are rotated at a given relatively high rate of speed, whereas the crop retarding roll, positioned immediately therebehind, is rotated at a relatively slower rate of speed.

A further object of my invention is the provision of a device of the class immediately above described which is relatively inexpensive to produce, which is foolproof in its operation, and is rugged and durable.

The above and still further and important objects of my invention will become apparent from the following detailed specification, appended claims and attached drawings.

Referring to the drawings wherein like characters indicate like parts throughout the several views:

Fig. 1 is a view in side elevation of my novel structure, some parts being broken away;

Fig. 2 is a view partly in horizontal section and partly in top plan as seen from the line 2—2 of Fig. 1;

Fig. 3 is an enlarged fragmentary sectional view taken on the line 3—3 of Fig. 1; and Fig. 4 is a sectional view taken substantially on the line 4—4 of Fig. 3.

Referring with greater particularity to the drawings, the numeral 1 indicates in its entirety a main frame of a conventional self-propelled swather, the drive wheels carried thereby being identified by the numeral 2, the sickle mower by the numeral 3, the reel by the numeral 4, and the motor, shown as being of the internal combustion type, by the numeral 5. As shown particularly in Fig. 2, such machines include a pair of transverse belt conveyors 6 and 7, the top flights of which, as indicated by arrows, travel inwardly and are spaced apart at their adjacent ends to provide a space 8 for the discharge of hay crop which has been cut by the sickle mower 3 and deposited on the belt conveyors 6 and 7 due to forward motion of the machine.

My novel attachment comprises a forwardly opening generally U-shaped sub-frame identified in its entirety by the numeral 9 and including generally longitudinally extending side members 10 and transversely connecting members 11. The forward ends of the side members 10 are removably secured to the main frame 1 of the machine by any suitable means, as indicated at 12. The rear end portion of the sub-frame 9 is supported by caster wheels 13. A longitudinally extended belt conveyor 14 is shown as having its rear end portion journaled between laterally spaced bearing plates 15 carried by mounting bracket means 16 suitably rigidly suspended from the sub-frame 9.

The forward end of the belt conveyor 14 is suitably supported by the front end portion of the main frame 1, through conventional connections including bracket elements 14a, one of which is shown, see Fig. 1, immediately rearwardly of the sickle mower 3 and in underlying relationship to the space 8 between the adjacent inner ends of the transverse conveyors 6, 7. As indicated by the arrow in Fig. 2, the upper flight 17 of the longitudinal conveyor 14 feeds rearwardly whereby to feed the cut crop deposited thereon by the transverse conveyors 6 and 7 and the central portion of the sickle mower 3 to a pair of crushing rollers 18 and 19. As shown particularly in Figs. 3 and 4, the crushing rollers 18 and 19 are provided with axially elongated cooperating crushing blades 20 which loosely intermesh and break and/or crush the stems of the cut crop fed therethrough, at spaced points. As shown particularly in Fig. 3, the lower crushing roller 18 is mounted fast on a shaft 21 which in turn is journaled at its opposite end portions in bearings 22 suitably mounted on the bracket means 16. The upper crushing roller 19 is likewise mounted on a shaft 23 which has its opposite ends suitably journaled in bearings 24 that are mounted on the front ends of a pair of supporting arms 25 pivotally secured intermediate their ends to the bracket means, as indicated at 26, see particularly Fig. 4. Yielding bias is exerted on the rear ends of the arms 25 through the medium of a coil compression spring 27 to move the upper crushing roller toward the lower one thereof. This arrangement permits solid material to pass through the crushing rollers without damaging same.

A crop speed retarding roll 28, preferably and as shown being provided with radially projecting teeth or blades 29, is mounted on a shaft 30 also suitably journaled in bearings 31 supported by bracket elements 32 rigidly secured to the sub-frame 9. It will be noted with reference to Figs. 1 and 4, that the crushing roller 19 is disposed slightly forwardly of the lower crushing roller 18, so that material discharged therefrom will be caused to be thrown rearwardly and upwardly toward the retarding roll 28, the upper limits of which are above the horizontal plane of the intermeshing portions of the crushing blades 20 of the crushing rollers 18, 19.

For the purpose of simultaneously driving the crushing rollers 18, 19 at a relatively high rate of speed and the retarding roll 28 at a relatively lower rate of speed, I provide an internal combustion engine 33 mounted on the sub-frame 9. An endless drive belt 34 is entrained over a drive pulley 35 fast on the shaft 36 of the engine 33 and an idler pulley 37 mounted on a horizontally disposed and suitably journaled jack shaft 38 carried by the sub-frame 9. An endless link chain 39, suitably driven from the shaft 38, is entrained over a sprocket 40 fast on the shaft 21 and a second sprocket 41 fast on the shaft 23 to drive the crushing rollers 18 and 19 in opposite directions to feed crushed material therebetween to the retard roller 28, as indicated by arrows in Fig. 4. A second endless link chain 42 is suitably driven from the jack shaft 38 and is entrained over a relatively large sprocket 43 that is mounted fast on a countershaft 44 journaled in bearings 45 on the sub-frame 9. A third endless link chain 46 is entrained over a relatively small sprocket 47 fast on the shaft 44 and a relatively large sprocket 48 fast on the shaft 30 of the retarding roll 28. With this novel arrangement, crushed crop traveling at a relatively high rate of speed as it leaves the crushing rollers 18 and 19 is greatly retarded by the slowly rotating retarding roll 28 and deposited gently on the ground in a highly fluffed windrow rearwardly of the retarding roll 28.

My invention has been thoroughly tested and found to be completely satisfactory for the accomplishment of the above objects and while I have shown a preferred embodiment thereof, I wish it to be specifically understood that same is capable of modification without departure from the scope and spirit of the appended claims.

What I claim is:

1. An attachment for hay crop swathing machines of the type including, a wheeled frame, an elongated sickle-type mower extending transversely of the forward end of said frame, and transverse belt conveyors mounted on said frame to the rear of said mower, said conveyors having top flights traveling laterally inwardly and being spaced apart at their adjacent ends to provide a space for the discharge of the cut crop; said attachment comprising, a wheel-equipped sub-frame adapted to be detachably secured to said first-mentioned frame so as to extend rearwardly thereof, a belt conveyor mounted on said sub-frame to extend longitudinally of the direction of travel of said swathing machine and having a rearwardly traveling top flight, a pair of transversely elongated crushing rollers each having radially extending projections loosely intermeshing with those of the other roller and mounted for rotation in said sub-frame, a speed retarding roll journalled for rotation in said sub-frame rearwardly of said crushing rollers and in the path of travel of crushed crop discharged by said crushing rollers, said longitudinally extended belt conveyor extending from a point immediately rearwardly of said mower and feeding into said crushing rollers, the front end portion of said longitudinally extended belt conveyor being adapted to underlie the space between the belt conveyors carried by said machine, and power means carried by said sub-frame for rotating said crushing rollers at a given rate of speed and for imparting rotation to said speed retarding roll at a slower rate than that of said crushing rollers.

2. In a hay crop swathing and treating machine having means for cutting hay and delivering the same rearwardly, said machine including a mobile frame, a pair of generally superposed elongated crushing rollers journalled for rotation on parallel axes extending transversely of the path of travel of the frame, means mounting one of said rollers for movements toward and away from the other thereof, said rollers each having radially extending projections loosely intermeshing with those of the other roller to receive the cut crop therebetween and crush the same, a retarding roller having radially extending projections and journalled for rotation on an axis parallel to the axes of said crushing rollers, said retarding roller being disposed rearwardly of said crushing rollers, power means for imparting rotation to said crushing rollers at a given rate of speed and in directions to eject the material rearwardly therefrom toward said speed retarding roll, and speed reduction mechanism coupled to said power means for imparting rotation to said speed retarding roll at a slower rate of speed than that of said crushing rollers.

3. The structure defined in claim 2 in which said means mounting one of said rollers for movements toward and away from the other thereof comprises a pair of arms journalled at their intermediate portions for swinging movements of the opposite ends thereof, said one of the crushing rollers being journalled at its opposite ends to the inner ends of said arms, and in further combination with spring means at the opposite ends of said arms and yieldingly urging said arms in a direction of swinging movement to move said one of the crushing rollers toward the other thereof.

References Cited in the file of this patent

UNITED STATES PATENTS

| | | |
|---|---|---|
| 2,510,245 | Munter | June 6, 1950 |
| 2,521,999 | Scott | Sept. 12, 1950 |
| 2,711,622 | Cunningham | June 28, 1955 |
| 2,727,347 | Fenster et al. | Dec. 20, 1955 |